United States Patent [19]

Phillips et al.

[11] Patent Number: 5,783,360
[45] Date of Patent: Jul. 21, 1998

[54] FLEXIBLE OPTICAL MEDIUM WITH DIELECTRIC PROTECTIVE OVERCOAT

[75] Inventors: Roger W. Phillips; Lauren R. Wendt. both of Santa Clara, Calif.

[73] Assignee: Flex Products, Inc., Santa Rosa, Calif.

[21] Appl. No.: 781,454

[22] Filed: Jan. 10, 1997

Related U.S. Application Data

[63] Continuation of Ser. No. 227,271, Apr. 13, 1994, abandoned.

[51] Int. Cl.$^6$ .................................................. G11B 7/24
[52] U.S. Cl. ................ 430/270.12; 430/945; 369/275.5; 369/288
[58] Field of Search ............... 430/270.11, 270.12, 430/270.15, 945, 273.1; 346/135.1; 369/275.5, 275.4, 288, 287; 427/167; 204/192.16, 192.22, 192.15, 298.26, 298.02, 298.23, 298.27

[56] References Cited

U.S. PATENT DOCUMENTS

| | | | |
|---|---|---|---|
| 3,665,483 | 5/1972 | Becker et al. | 346/135.1 |
| 4,300,143 | 11/1981 | Bell et al. | 346/135.1 |
| 4,309,075 | 1/1982 | Apfel et al. | 359/586 |
| 4,335,198 | 6/1982 | Hanada et al. | 346/135.1 |
| 4,388,400 | 6/1983 | Tabei et al. | 430/945 |
| 4,565,719 | 1/1986 | Phillips et al. | 428/34 |
| 4,600,625 | 7/1986 | Abe et al. | 430/271.1 |
| 4,702,963 | 10/1987 | Phillips et al. | 428/426 |
| 4,710,418 | 12/1987 | Takano et al. | 346/135.1 |
| 4,859,492 | 8/1989 | Rodgers, Jr. et al. | 427/162 |
| 4,906,498 | 3/1990 | Ichikawa et al. | 346/135.1 |
| 5,063,096 | 11/1991 | Kohara et al. | 430/945 |
| 5,105,310 | 4/1992 | Dickey | 359/586 |

OTHER PUBLICATIONS

Apfel, Joseph H., "Graphics in Optical Coating Design" Applied Optics vol. 11, No. 6 pp. 1303–1312. (Jun. 1972).
Apfel, Joseph H. "Optical Coating Design with Reduced Electric Field Intensity" Applied Optics, vol. 16, No. 7 pp. 1880–1885 (Jul. 1977).
Jenkins & White "Fundamentals of Optics" ©1976 pp. 288–294.
Apfel, "Graphics in Optical Coating Design", Applied Optics, Jun., 1972, vol. II, No. 6, pp. 1303–1312.
"Digital Paper," Feb. 1989, BYTE magazine, McGraw-Hill, Inc., New York, New York 10020.
"Vapor Deposits Processes" pp. 24–1 through 24–29.

Primary Examiner—Martin Angebranndt
Attorney, Agent, or Firm—Flehr Hobach Test Albritton & Herbert LLP

[57] ABSTRACT

Flexible optical medium comprising a flexible substrate having a surface. An imaging layer is carried by the surface and a protective overcoat of silicon dioxide is provided on the imaging layer to provide abrasion resistance for said imaging layer.

1 Claim, 4 Drawing Sheets

FLEXIBLE OPTICAL MEDIUM WITH DIELECTRIC PROTECTIVE OVERCOAT

This is a continuation of application Ser. No. 08/227,217 filed Apr. 13, 1994, now abandoned.

This application is a continuation-in-part of application Ser. No. 08/000,798 filed on Jan. 4, 1993, now abandoned, which is a file wrapper continuation of application Ser. No. 07/693,771 filed on Apr. 26, 1991 which is a continuation of application Ser. No. 07/452,553 filed on Dec. 19, 1989.

This invention relates to a flexible optical medium and more particularly to a flexible optical medium with a dielectric protective overcoat.

At the present time there is being developed write-once optical media that can store large quantities of data. A review of such efforts is disclosed in an article entitled "Digital Paper" published in the February 1989 issue of BYTE magazine by McGraw-Hill, Inc., New York, N.Y. 10020. Development of such products has been hindered because they currently suffer from abrasion, either due to head wear on flexible disks or due to capstan wear in the case of optical tape. In addition on optical tape, abrasion is caused by the rubbing back and forth of the flexible tape as it slips on the rolls on which it is wound. It has been found that such abrasion causes damage to the optical media. There is a need for preventing such abrasion while not interfering with the recording and reading capabilities of the flexible optical media.

In general, it is an object of the present invention to provide a flexible optical medium with dielectric protective overcoat and a method for providing an optical medium with a dielectric protective overcoat.

Another object of the invention is to provide a flexible optical medium and method of the above character in which the protective coating does not negatively interfere with the writing and reading characteristics of the optical medium.

Another object of the invention is to provide a flexible optical medium and method of the above character in which the medium will not lose information during use.

Another object of the invention is to provide a flexible optical medium and method of the above character which can be formed into disks, cards or tape.

Another object of the invention is to provide a flexible optical medium and method of the above character which is durable and has a long shelf life.

Additional objects and features of the invention will appear from the following description in which the preferred embodiments are set forth in conjunction with the drawings.

In general, the flexible optical medium of the present invention is comprised of a flexible substrate which has a surface. An imaging layer is carried by the surface. A protective overcoat of silicon dioxide is provided on the imaging layer to provide abrasion resistance for the imaging layer.

Figure 1:
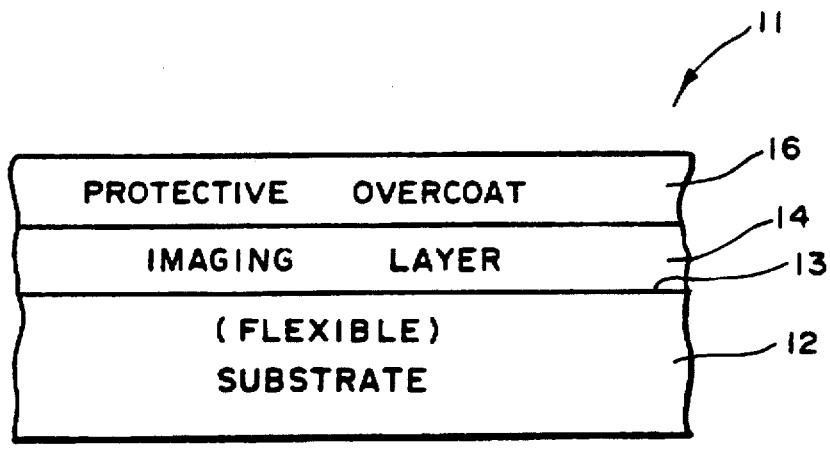
FIG. 1 is a cross sectional view of an optical medium incorporating the present invention.

More particularly, as shown in the drawings and in particular, FIG. 1, the flexible optical media 11 consists of a flexible substrate 12 formed of a suitable plastic such as a polyester or a polycarbonate having a thickness of approximately three mils, but the thickness can range from 1 to 7 mils. It should be formed of a material which is dimensionally stable under temperature so that it will not distort the optical information recorded in the media after recording has taken place. The substrate can be transparent or it can be opaque unless it is desired to read the media from the back side. If that is not required, then the substrate can be opaque if desired. The substrate is provided with a surface 13.

An imaging layer 14 is deposited on the surface 13 and can range in thickness from 100 to 5000 Å depending on the imaging layer system. The imaging layer 14 can be formed of materials of the type hereinafter described. A protective overcoat 16 is deposited upon the imaging layer 14. The protective overcoat is formed of silicon dioxide which is deposited by electron beam evaporation in a roll coater. The silicon dioxide is a dielectric and is non conducting and has an index of refraction of approximately 1.45. Alternatively, it can be formed of a single layer of $TiO_x$ (x=1.0–2.0) or a combination of $SiO_2/TiO_x$ layers.

It is desirable to deposit the silicon dioxide in a cold process by evaporating the silicon dioxide against a cold drum on which the substrate is rolling. By way of example, the drum can be cooled to a temperature as low as 20° C., however the temperature can range from −20° to +50° C. It has been found that it is desirable to utilize cooling when evaporating the silicon dioxide in order to prevent heating the imaging layer, particularly when it is formed of an organic dye system or a metal having a low melting temperature or when it is formed of a metal alloy which assumes different forms at different temperatures.

Typically the silicon dioxide layer is deposited to a certain thickness in order to optimize the desired reflectivity of the imaging media. It has been found that it is desirable to provide some reflectivity from the protective overcoat in order to focus the imaging which is utilized for writing on the medium and reading from the medium. However, the reflectivity cannot be too great because this would interfere with the absorption of laser light and subsequent heating to form an optical bit in the imaging layer. Typically, it has been found that it is desirable to have the reflectivity range from 20 to 60% with an absorption of 40–80%.

The deposition of the silicon dioxide in the roll coater can be monitored optically so that deposition can be regulated to maintain a predetermined reflectivity. It has been found that a the reflectivity can be optimized when a single thickness of a silicon dioxide layer of less than one quarter wavelength at the laser wavelength is deposited. Increasing the thickness of the silicon dioxide layer 16 beyond this point increases the hardness of the protective overcoat but may alter the reflectively adversely and it becomes more brittle. Thus, for example, a quarter wave at 2000 nanometers would be too thick.

Figure 2:
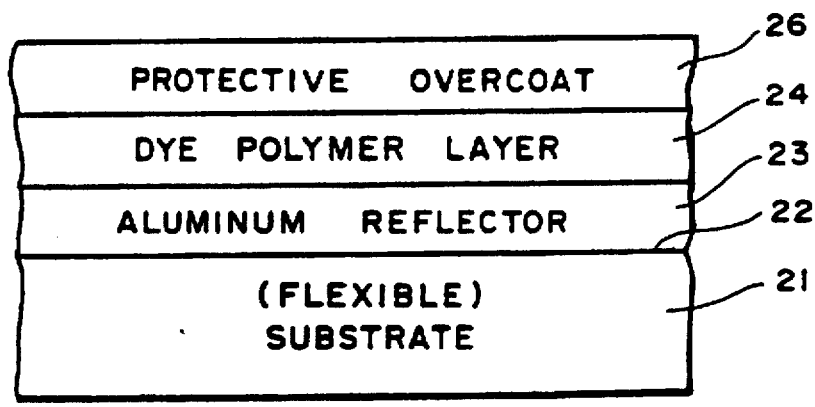
FIG. 2 is a cross sectional view of an optical medium of the type shown in FIG. 1 but utilizing an aluminum reflector and a dye polymer layer as the imaging layer.

Another embodiment of the invention is shown in FIG. 2 in which the imaging layer takes the form of aluminum reflector covered by a dye polymer layer. A substrate 21 is provided formed of polyethylene terephthalate (PET) having a suitable thickness ranging from 1 to 7 mils and preferably a thickness of approximately 3 mils. It is provided with a surface 22 upon which there is deposited an aluminum metal reflective layer having a thickness ranging from 500 to 600 Å. A dye polymer layer 24 is deposited on the aluminum reflecting layer 23. This type of flexible optical media has been developed by Imagedata which is a subsidiary of Imperial Chemical Industries as described in a paper entitled "Digital Paper" referred to above. The optical media utilizes a write-once pyroplastic deformation technique to create data pits in the media. The recording pits are formed in dye layer 24 immediately above the reflective aluminum layer 23, not in the aluminum reflective layer 23. Interference effects are utilized to read the data recorded in the media by a technique well known to those skilled in the art. In accordance with the present invention, a protective overcoat 26 is provided which is formed of silicon dioxide that has been electron beam evaporated in a roll coater.

Figure 3:
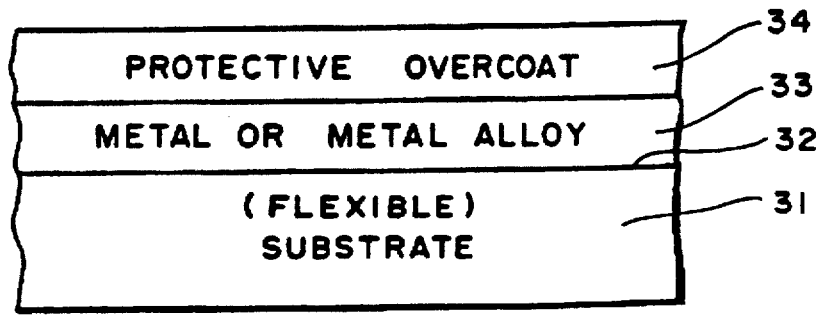
FIG. 3 is a cross sectional view of a flexible optical media of the type shown in FIG. 1 but which utilizes a metal or metal alloy imaging layer.

Still another embodiment of the present invention utilizing a metal or metal alloy as the imaging layer is shown in FIG. 3. As shown therein, the flexible optical media consists of a flexible substrate 31 with a thickness ranging from 1 to 7 mils and typically formed of PET having a thickness of 3 mils. The substrate is provided with a surface 32 upon which a metal or metal alloy layer 33 is deposited to a thickness ranging from 80 to 1000 Å and, preferably 100–300 Å. Optical media of this type has been developed by Dow Chemical Co. as disclosed in U.S. patent application Ser. No. 105,426 filed on Oct. 7, 1987, now U.S. Pat. No. 4,998,239, based on U.S. application Ser. No. 14,882 filed on Feb. 13, 1987, as disclosed in Australian application No. 8812228 dated Sep. 14, 1988, and PCT application No. 8806337 dated Aug. 25, 1988. As disclosed therein, such a coating can have a thickness in the range of 20 to 10,000 Å. It is a metal alloy including at least 5% by weight of each of at least two of the metals selected from cadmium, indium, tin, antimony, lead, bismuth, magnesium, copper, aluminum zinc and silver. Such a coating provides good dimensional and environmental stability.

In accordance with the present invention, a protective overcoat 34 of silicon dioxide is deposited over the metal or metal alloy layer 33 and has a thickness ranging from 500 to 1500 Å.

The silicon dioxide protective overcoat utilized in connection with the following invention can be deposited in a single pass in a roll coater. Also the metal or metal alloy layer can be deposited in a single pass. Generally metals can be vacuum deposited by a variety of techniques including resistive heating, sputtering and electron beam evaporation. Unless the metal alloy evaporates congruently, it must be deposited by some form of sputtering process. Although electron beam processes are used to deposit the silicon dioxide, other deposition processes such as RF sputtering, and various types of CVD processes including microwave and RF induced plasma processes that are known to those skilled in the art of thin film deposition can be used. Currently if desired, the metal layer and the silicon dioxide layer can be deposited simultaneously in the same pass in the roll coater.

In connection with the present invention, the silicon dioxide dielectric layer has been selected for dual purposes. In addition to being selected to provide abrasion resistance for the imaging layer, it also has been selected to provide the desired reflectivity and absorption for the optical medium, or in other words, to optimize the reflectivity of the optical medium. In the present invention, the reflectivity of the coating media has been purposely changed to enhance the recorded signal while maintaining the absorption of the recording layer and hence the laser write threshold. Thus, it can be seen that the dielectric overcoat of the present invention is more than just a protective overcoat. It also functions as an interference layer to control the overall reflectance. If the recording medium is too thin, it will not have sufficient absorption for the laser light to cause localized heating of the media to form a data bit. In addition, the recording layer will not have a high enough reflectance for signal control. If the coating thickness of the recording medium is increased in thickness to increase the absorption, then the reflectance becomes too large for optimum signal control and in addition the laser write threshold is increased.

In the present invention, the addition of an interference layer on top of the recording layer is provided to achieve the correct reflectance while still maintaining the proper thickness of the recording layer. By utilizing a dielectric overcoat of a single material or a high index, low index pair where the low index oxide layer thickness is less than a quarter wave at the laser wavelength, an abrasion resistant coating can be provided while achieving optimal recording and reading capabilities of the flexible optical medium.

Figure 4:
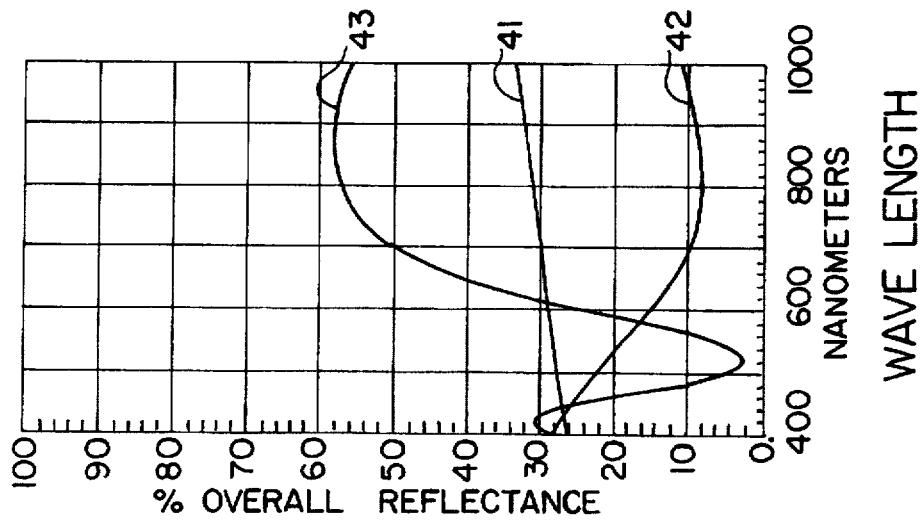
FIG. 4 is a graph showing reflectance curves for an optical medium utilizing 100 Å of a metal alloy.

In the graph shown in FIG. 4 three reflectivity curves, 41, 42 and 43 extend over a wavelength range of 400–1,000 nanometers for a 100 Å thick layer of the Dow metal alloy hereinbefore described on one side of a PET substrate is shown. For the case of the laser diode operating at 820 nanometers, the reflectance is approximately 31% for the metal alloy only as shown by the reflectance curve 41. The addition of a one-quarter wave at 711 nanometers (1,226 Å) of silicon dioxide deposited over the top of the metal alloy layer reduces the reflectance to approximately 8% at 820 nanometers as shown by the curve 42. When a layer of $TiO_x$ (x=1.0–2.0) with a thickness of one-quarter wave at 861 nanometers (1,025 Å) is deposited on top of the silicon dioxide layer, the reflectance is increased up to 58% at 820 nanometers as shown by curve 43 which is near the optimum value for signal control in accordance with the present invention.

Figure 5:
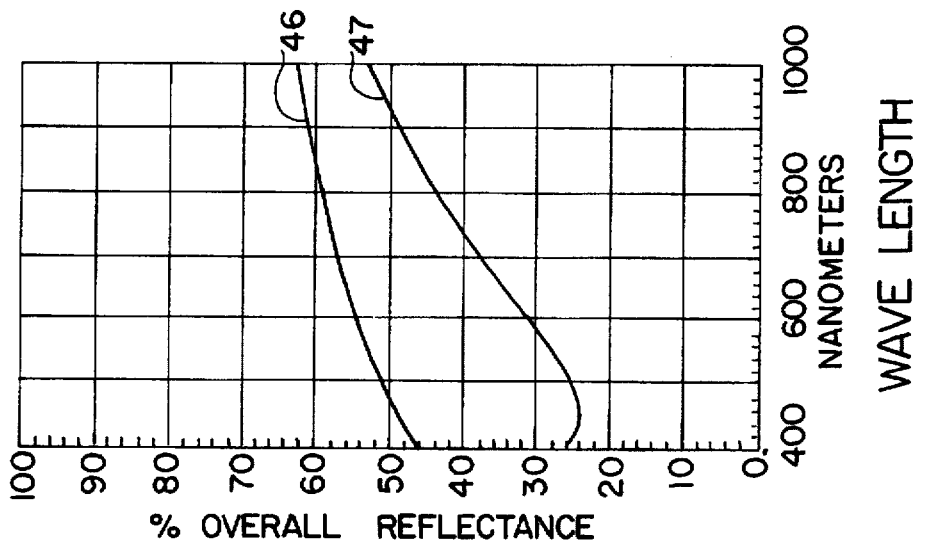
FIG. 5 shows reflectance curves for an optical medium utilizing 300 Å of a metal alloy.

In FIG. 5 there are shown two additional reflectance curves 46 and 47 over the range of 400–1,000 Å for a 300 Å thick layer of the Dow metal alloy hereinbefore described on one side of a PET substrate. At the same diode laser wavelength of 820 nanometers, the metal layer only represented by the curve 46 has 60% reflectance. When the 300 Å metal alloy layer is overcoated with a dielectric layer of silicon dioxide to a thickness of one-quarter wavelength at 400 nanometers (690 Å), the reflectance is reduced to approximately 45% at 820 nanometers as shown by the curve 47.

Figure 6:
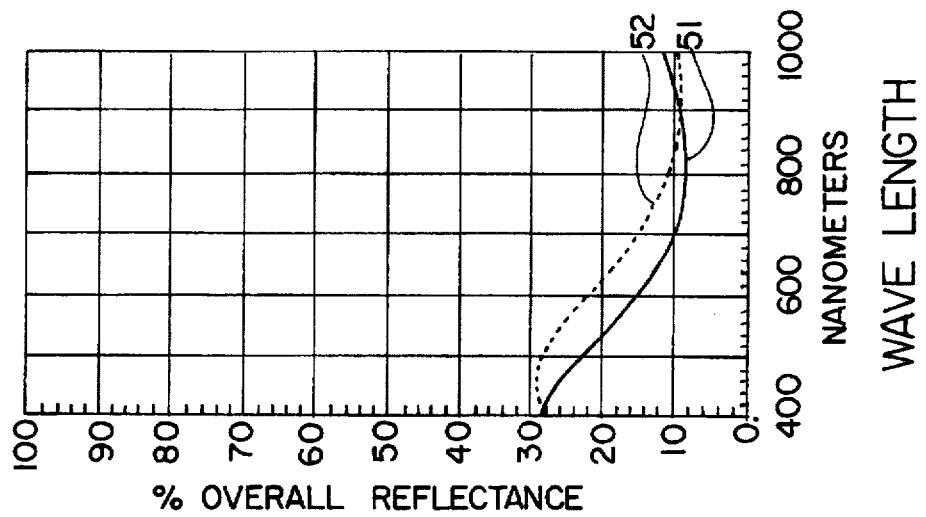
FIG. 6 is a graph showing comparative reflectance curves of an optical medium with 100 Å of a metal alloy.

In FIG. 6 there is a graph which shows the reflectance over the range of 400–1,000 nanometers with 100 Å of the Dow metal alloy on one side of a polyester substrate followed by a silicon dioxide dielectric layer at a thickness of one-quarter wavelength at 711 nanometers to provide a reflectance as shown by the curve 51 of approximately 8% at 820 nanometers. Curve 52 is for the same thickness of 100 Å of the Dow metal alloy followed by a thicker layer of silicon dioxide of about one-quarter wavelength at 820 nanometers to provide a reflectance at 820 nanometers as shown by the curve 52 of approximately 10%. Thus, it can be seen that a quarter wave of silicon dioxide at 820 nanometers will not produce the lowest reflectance at 820 nanometers. The lowest reflection using λ/4 at 820 nanometers occurs at a higher wavelength at approximately 920 nanometers. For a minimum to occur at 820 nanometers (the laser diode wavelength), a thickness of $SiO_2$ has to be at one-quarter wavelength at 711 nanometers (lower than the laser wavelength).

Figure 7:
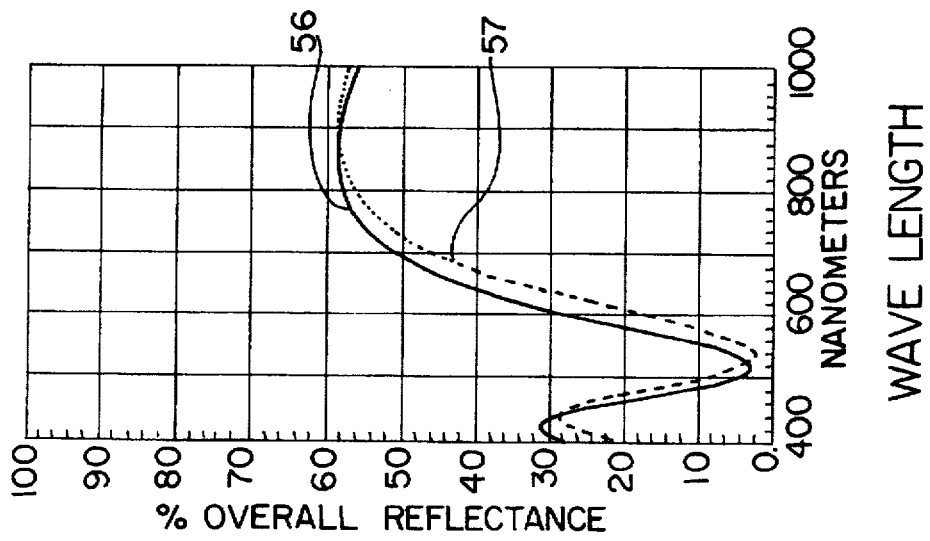
FIG. 7 is a graph showing additional reflectance curves of an optical medium with 100 Å of a metal alloy.

In FIG. 7, there is shown a graph ranging from 400–1,000 nanometers with a Dow metal alloy layer of 100 Å in thickness deposited on one side of a flexible substrate showing two reflectance curves 56 and 57. The curve 56 represents the reflectance of a 100 Å thick Dow metal alloy layer followed by a low index dielectric layer of silicon dioxide at 711 nanometers followed by a high index dielectric layer at 861 nanometers to provide a low-high index pair. The reflectance provided by this low-high index pair is shown by the curve 56.

The other curve 57 shows a reflectance curve for the low-high index pair formed of silicon dioxide and $TiO_x$ with both having quarter wave optical thicknesses at 820 nanometers (the laser wavelength). By examining FIG. 7 it can be seen that the maximum in reflectance occurs at the laser wavelength 820 nanometers where the silicon dioxide layer is a quarter wave at 711 nanometers and the $TiO_x$ layer is a quarter wave optical thickness at 861 nanometers to provide a reflectance as shown by curve 56 of FIG. 7. In other words, the low index $SiO_2$ layer has an optical thickness less than one quarter wavelength at the laser design wavelength of 820 nanometers and correspondingly the high index $TiO_x$ has an optical thickness greater than one quarter wavelength at the laser design wavelength of 820 nanometers. The curve 57 also shown in FIG. 7 shows the reflectance curve for a low-high index pair of silicon dioxide and titanium oxide both having quarter wave optical thicknesses at 820 nanometers (the laser wavelength). By comparing these two curves it can be seen that the maximum reflectance occurs at the laser wavelength of 820 nanometers where the silicon dioxide layer is a quarter wave optical thickness at 711 nanometers and the titanium oxide layer is a quarter wave optical thickness of 861 nanometers. Also from these two curves 56 and 57 it can be seen that when utilizing a quarter wave optical thickness of each of the two materials at the laser wavelength of 820 nanometers the maximum reflectivity occurs at approximately 900 nanometers whereas with the combination of low-high pairs at thicknesses other than the laser wavelength a maximum reflectivity is obtained at the 820 nanometer position.

Figure 9:
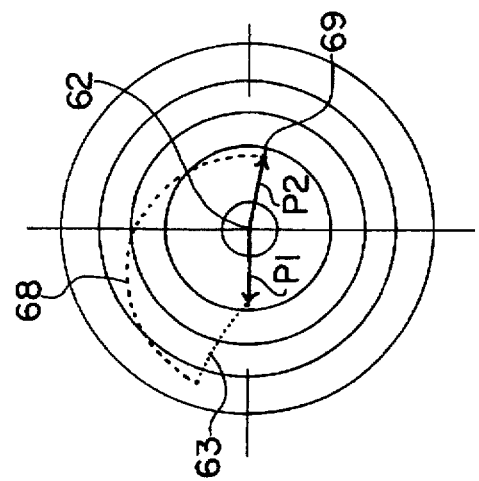
FIG. 9 is a circle diagram similar to FIG. 8 but utilizing a thinner layer of $SIO_2$.
Figure 8:
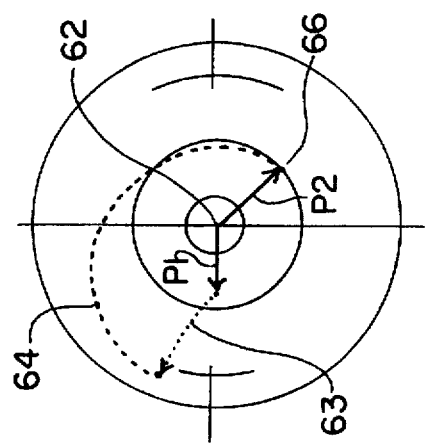
FIG. 8 is a circle diagram for the complex reflectance.

In FIGS. 8 and 9 there are shown circle diagrams showing why it is necessary to use a quarter wave optical thickness of silicon dioxide less than one-quarter wave of the laser wavelength. FIG. 8 shows a circle diagram for the complex reflectance where the $SiO_2$ is deposited to a quarter wave optical thickness at 820 nanometers The use of circle diagrams in optical coating design is described in publication entitled "Graphics in Optical Coating Design" (Joseph H. Apfel, *Optical Coating Laboratory, Inc.*, June, 1972, Vol. 11, No. 6, *Applied optics*, pgs. 1303–1312). As described therein, the complex reflectance is comprised of both real and imaginary parts of the reflectance. The reflectance of a growing film can be characterized by a vector P1 which emerges from the origin 62. The reflectance of the substrate is represented by the vector P1 and is defined by the Fresnel equation $\rho = n_1 - n_2/n_1 + n_2$, where $n_1$ and $n_2$ refer to the refractive indices of the two materials bound by an interface. As the metal or metal alloy is deposited on the surface of the substrate, reflectance vector 63 as shown in FIG. 8 traverses a curve starting from r=−2.4. Thereafter, the dielectric formed of silicon dioxide is deposited onto the metal layer represented by the vector 63 to provide another reflectance vector which traverses clockwise around to a point 66 to provide a vector P2 having a value of 0.3 extending from the origin to the point 66. By definition, the squaring of P2 gives a reflectance of 0.09 (9% reflection) which is approximately equal to that found on the curve in the curve 52 at 820 nanometers.

In FIG. 9 there is shown another circle diagram similar to that shown in FIG. 8 but with a thinner layer of silicon dioxide, i.e. at a quarter wave of optical thickness of 711 nanometers (less than one-quarter wave at the laser wavelength) represented by the reflectance vector 68 which because of it being thinner ends sooner at a point 69 to form the vector P2 which is shorter, as for example 0.27 when squared is a reflectance of 0.07 (7% reflection) which is a lower value of reflectance than that which is obtained with the thicker $SiO_2$ layer as shown in FIG. 8.

The circle diagrams explain why a thinner layer of silicon dioxide is needed in order to obtain a minimum of reflectance at 820 nanometers. This is because the metal layer that has already been deposited on the plastic film provides a phase shift to the reflectance. This phase shift causes the minimal reflectance to be displaced to longer wavelengths than if that phase shift had not been present. Thus, instead of using a full quarter wave at 820 nanometers it is necessary to use less than one-quarter wave at 820 nanometers in order to achieve the minimum reflectance. These graphs demonstrate that a thin layer of silicon dioxide, thinner than one-quarter wavelength of the laser wavelength of 820 nanometers produces lowest reflectance at 820 nanometers with that laser wavelength.

Thus, in any of the embodiments of the present invention, the thickness of the dielectric layer, as for example the $SiO_2$ layer, is any thickness which is less than one-quarter wave at the laser wavelength, making it possible to control the reflectivity anywhere from 7% all the way up to 28% as seen from the foregoing examples. In other words, the thickness of a single layer of silicon dioxide in accordance with the present invention should have a thickness no greater than one-quarter wavelength at the laser imaging wavelength to achieve the desired minimum reflectance. The examples given above show that the minimal reflectance occurs at a one-quarter wavelength at 711 nanometers rather than 820 nanometers (the laser imaging wavelength).

Figure 11:
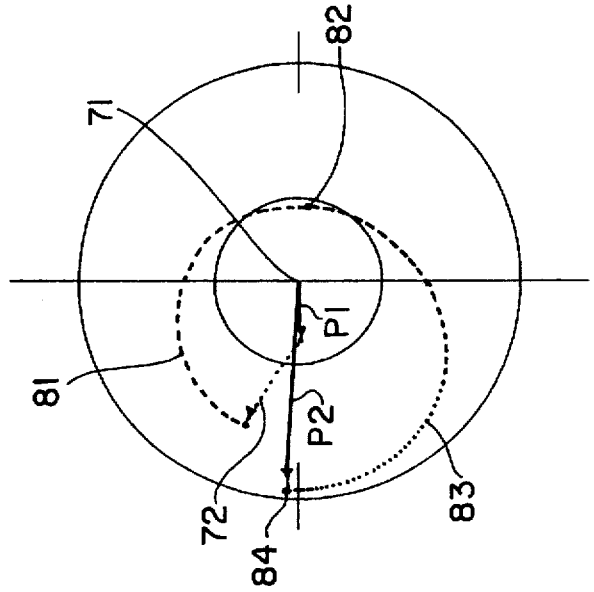
FIGS. 10 and 11 are additional circle diagrams for 100 Å of a metal alloy.
Figure 10:
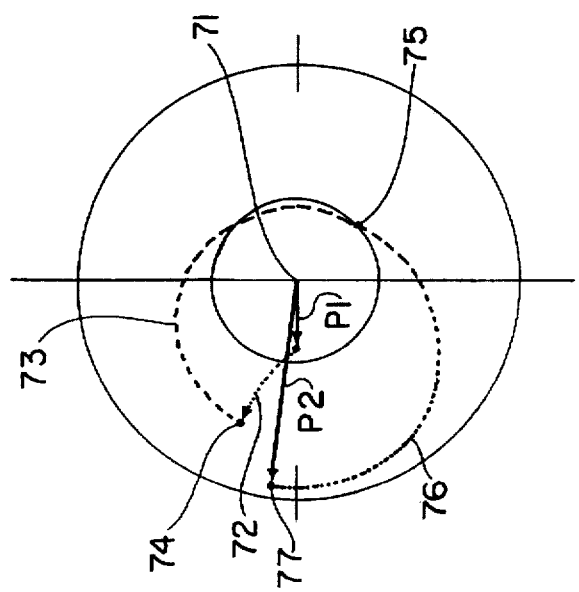

FIGS. 10 and 11 show circle diagrams for the 100 Å Dow metal alloy using a low/high index dielectric pair deposited over the metal alloy. Thus, in FIG. 10 starting with the origin 71 there is provided the vector P1 representing the substrate followed by the curved vector 72 representing increasing thicknesses of the Dow metal alloy. Vector 73 traveling clockwise from point 74 (100 Å of the metal alloy) to a point 75 represents the deposition of the silicon dioxide at the quarter wave optical thickness at 820 nanometers. Vector 76 represents the high index layer of titanium oxide still traveling in a clockwise direction to a point 77 in which the distance from the origin is represented by the vector P2.

A similar circle diagram is shown in FIG. 11 in which a thinner layer of silicon dioxide is deposited represented by the vector 81, as for example a quarter wave at 711 nanometers extending to a point 82 in a circle diagram and followed by another vector 83 representing the deposition of the titanium oxide layer to a quarter wave optical thickness of 861 nanometers extending to a point 84 to provide a vector P2 extending from the origin 71.

In both FIGS. 10 and 11, the reflectance vector P2 is approximately the same magnitude but in the case shown in FIG. 10, it traverses a little further around the trajectory than is the case shown in FIG. 11. Thus, it would be expected that the reflectance would be about the same in both cases but in FIG. 10 the reflectance maximum is a longer wavelength. This is shown in FIG. 1 where the reflectances are about the same at 58%. Note that the low/high index pair has a thickness other than λ/4 at 820 nanometers to produce a maximum reflectance at the laser wavelength of 820 nanometers.

Figure 12:
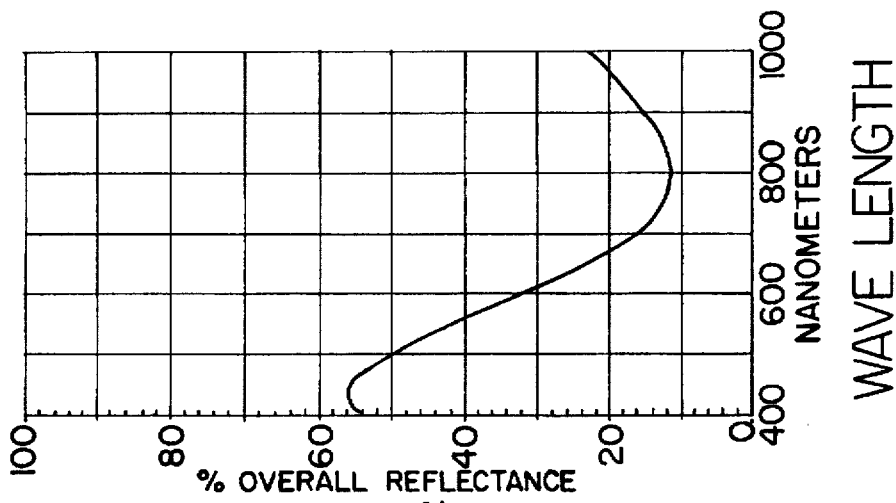
FIG. 12 is a graph showing a reflectance curve for 300 Å of a metal alloy.

If it is desired to utilize a thicker layer of the metal alloy, as for example 300 Å, it is generally desirable to reduce the reflectance from 60% down to somewhere in the region of 40%. This can be achieved by putting on the metal alloy as a quarter wave of the silicon dioxide at a wavelength less than the laser wavelength, i.e. one-quarter wave of $SiO_2$ at 400 nanometers or alternatively a titanium oxide layer at one-quarter wave optical thickness at 650 nanometers which is less than one-quarter wave optical thickness at the laser wavelength. Such a result is shown in FIG. 12 where there is shown a curve 91 for 300 Å of the Dow metal alloy with a titanium dioxide ($TiO_x$) at one-quarter wave optical thickness of 650 nanometers (less than one-quarter wave optical thickness at the laser wavelength) to reduce the reflectance to nearly 10% at 820 nanometers.

From the foregoing it can be seen that there are two general situations. The first as hereinbefore described is one in which a relatively thin metal alloy layer is used, as for example 100 Å in thickness where the reflectance is generally low. In such a case, there is a need to boost the reflectance by depositing onto the thin metal layer, a low-high pair to increase the reflectance. In contrast, when a relatively thick metal alloy layer is used, as for example 300 Å in thickness, the reflectivity is high to start with and a lower reflectance is desired. This can be accomplished by either putting on a low index silicon oxide layer or a high index titanium oxide layer either being deposited at a thickness of less than one-quarter wave at the laser wavelength. Thus, it can be seen that the resultants of putting down either a single layer of a dielectric or a low-high pair of dielectrics on a metal imaging layer can be controlled from 10–60% with an absorption between 40–90%.

It has been found that flexible optical medium made in accordance with the present invention has excellent durability and is highly resistant to abrasion. In the thickness provided, the protective overcoat has sufficient flexibility so that the flexible medium can be wrapped in rolls and utilized as tape as well as being suitable for flexible disks or optical cards. In addition, the protective overcoat optimizes the normal writing and reading functions performed with such flexible disks or cards. The flexible optical media of the present invention can be produced quite inexpensively and at high rates in roll coaters.

What is claimed is:

1. A flexible optical medium for operating with a laser beam having a predetermined laser design wavelength comprising a flexible substrate having a surface, a metal imaging layer having a thickness ranging from 100 to 300 Å carried by said surface and a protective overcoat layer of a dielectric non-conducting material on said imaging layer to provide an optimum reflection and abrasion resistance for said imaging layer, said protective overcoat of material being formed of a pair of layers comprised of $SiO_2$ and $TiO_x$ (x=1.0–2.0) respectively wherein the $SiO_2$ layer has a thickness less than ¼ of optical thickness at the laser design wavelength and the $TiO_x$ layer has a thickness greater than one-quarter of optical thickness at the laser design wavelength.

* * * * *